United States Patent [19]

Cirkel et al.

[11] Patent Number: 4,521,889
[45] Date of Patent: Jun. 4, 1985

[54] MICROSTRIP CAPACITOR FOR ENERGY STORAGE, PREFERABLY FOR HIGH-ENERGY LASERS

[75] Inventors: Hans-Jürgen Cirkel; Willi Bette; Reinhard Müller, all of Erlangen, Fed. Rep. of Germany

[73] Assignee: Kraftwerk Union Aktiengesellschaft, Mülheim, Fed. Rep. of Germany

[21] Appl. No.: 396,651

[22] Filed: Jul. 9, 1982

[30] Foreign Application Priority Data

Jul. 16, 1981 [DE] Fed. Rep. of Germany ....... 3128206

[51] Int. Cl.³ ............................................. H01S 00/00
[52] U.S. Cl. ....................................... 372/87; 372/83; 372/38
[58] Field of Search .......................... 378/87, 83, 38, 81

[56] References Cited

U.S. PATENT DOCUMENTS 4,365,337 12/1982 Cirkel et al. .......................... 372/87

Primary Examiner—William L. Sikes
Assistant Examiner—Léon Scott, Jr.
Attorney, Agent, or Firm—Herbert L. Lerner; Laurence A. Greenberg

[57] ABSTRACT

Sheetform conductor type capacitor for energy storage in combination with a high-energy laser of the TE type, the laser having an optical axis, a laser chamber with at least two laser electrodes having a gas space therebetween, the laser electrodes being spaced apart opposite each other and extended parallel to the optical axis, excitation taking place by an arc-free capacitor discharge in the gas space being as homogeneous as possible, and pre-ionization devices associated with the laser electrodes, a pulse forming network, connected to the laser electrodes, coatings of the sheetform conductor type capacitor connected to the laser electrodes, electrodes defining a fast-high-voltage contact-break distance, the contact-break electrodes being connected to the laser electrodes, dielectric layers disposed between the coating of the sheetform conductor type capacitor in a direction substantially normal to a given stacking direction thereto parallel to the optical axis of the laser, the at least two laser electrodes including a first electrode connected through the sheetform conductor type capacitor to the pulse-forming network for a high voltage pulse, and a second electrode being disposed opposite the first electrode being connected to ground potential, wherein the improvement comprises at least one of the sheetform conductor type capacitors connected to the first laser electrode having notches formed therein for increasing the length of their current path for discharge current.

14 Claims, 9 Drawing Figures

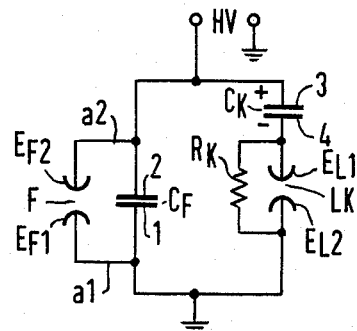
PRIOR ART FIG 1
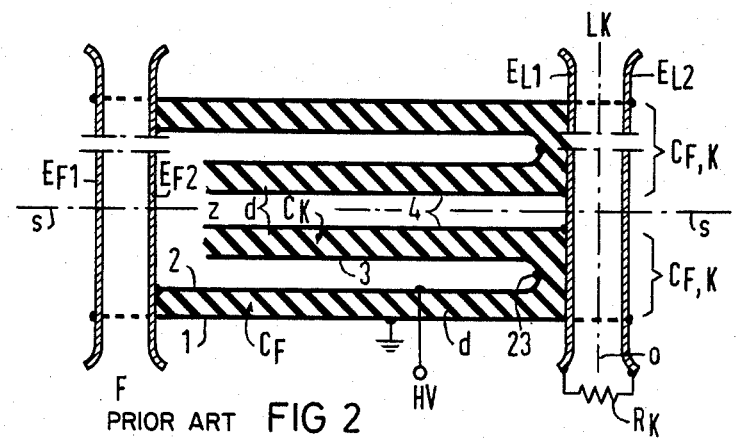
PRIOR ART FIG 2
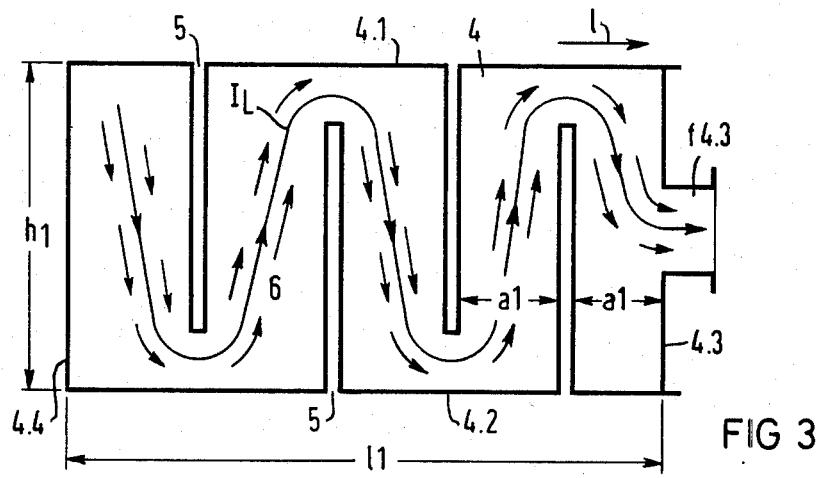
FIG 3

MICROSTRIP CAPACITOR FOR ENERGY STORAGE, PREFERABLY FOR HIGH-ENERGY LASERS

The invention relates to a microstrip capacitor for energy storage and to a microstrip capacitor for energy storage in combination with a high-energy gas laser of the TE type.

A microstrip capacitor for energy storage is known from German Published, Non-Prosecuted Application DE-OS No. 29 32 781, corresponding to U.S. application Ser. No. 177,442, filed Aug. 12, 1980, and now U.S. Pat. No. 4,365,337 which describes several embodiments for an associated high-energy gas laser of the TE type. A suitable pre-ionizing device for high-energy gas lasers is described more particularly in U.S. application Ser. No. 303,167, filed Sept. 17, 1981.

Such TE lasers (TE=transversely excited) are required at moderate cost and with a high level of average radiated and light power for photochemical applications, and more particularly in the industrial sphere. The lowest possible wave impedances of the pulse-forming network with sufficiently high current increase velocities are advantageous for the operation of these lasers. This can be obtained by a suitable combination of the inductances of the excitation circuit with the capacitances of the pulse-forming network, when the excitation circuit is understood to refer to the combination of a pulse-forming network and a laser head. For many applications of these TE lasers it is also desirable to produce a laser pulse which is as long as possible. These requirements would be met in the most advantageous manner by a square-wave pulse as an exciting pulse, that is, a current pulse with a steep leading edge, a flat top which is as wide as possible, and a step trailing edge. However, this has not been accomplished in the prior art devices.

It is accordingly an object of the invention to provide a microstrip capacitor for energy storage, preferably for high-energy lasers, which overcomes the hereinbefore-mentioned disadvantages of the heretofore known devices of this general type, and to produce exciting pulses within the pulse forming network, which largely correspond to the aforementioned requirements.

With the foregoing and other objects in view there is provided, in accordance with the invention, a microstrip capacitor for energy storage in combination with a high-energy laser of the TE type, the laser having an optical axis, a laser chamber with at least two laser electrodes having a gas space therebetween, the laser electrodes being spaced apart opposite each other and extended parallel to the optical axis, excitation taking place by an arc-free capacitor discharge in the gas space being as homogeneous as possible, and pre-ionization devices associated with the laser electrodes, a pulse forming network, such as a Blümlein or charge transfer circuit, connected to the laser electrodes, coatings of the microstrip capacitor connected to the laser electrodes, electrodes defining a fast high-voltage contact break distance, the contact break electrodes being connected to the laser electrodes, dielectric layers disposed between the coatings of the microstrip capacitor in a direction substantially normal to a given stacking direction thereof parallel to the optical axis of the laser, the at least two laser electrodes including a first electrode connected through the microstrip capacitor to the pulse forming network for a high voltage pulse, and a second electrode being disposed opposite the first electrode being connected to ground potential, wherein the improvement comprises at least one of the coatings of the microstrip capacitor connected to the first laser electrode having notches formed therein for increasing the length of their current path for discharge current.

In accordance with another feature of the invention, there is merely provided a conductive coating having notches formed therein for increasing the length of the current flow path in the coating.

In accordance with a further feature of the invention, the notched coating has a face, two opposide sides and a third side having an electrode contact face integral with the third side, the two opposite sides having the notches alternately formed therein in a given coating side direction and extended into the coating, the notches being mutually spaced apart forming meandering current paths along the coating face up to the electrode contact face.

In accordance with an additional feature of the invention, the notched coating has two opposite sides having the notches formed therein opposite each other in pairs and extended from the sides into the coating in a given coating side direction, the notches being mutually spaced apart and leaving current path webs remaining between opposite notches.

In accordance with yet another feature of the invention, the notches are mutually parallel.

In accordance with yet a further feature of the invention, the notched coating is substantially quadrilateral.

In accordance with yet an additional feature of the invention, the notched coating has two opposite longitudinal sides and a narrow side having an electrode contact face integral with the narrow side, the two opposite sides having the notches formed therein and extended from the sides into the coating.

In accordance with yet an added feature of the invention, the mutual spacing between the notches increases toward the electrode contact face.

In accordance with an alternate feature of the invention, the notched coating has an outer edge and an outer electrode contact face, and the notched coating has the notches formed therein in the form of a spiral extended from the outer edge to inside the coating, producing current paths extended in a spiral from inside the coating to the outer electrode contact face.

In accordance with still a further feature of the invention, the notched coating has an outer periphery and an electrode contace face integral therewith, and the notches are in the form of substantially L-shaped notches varying in size and being nested inside each other and extended into the coating from a common leg connecting notch disposed in vicinity of the outer periphery, forming mutually parallel component current paths which open into a common collecting current path outside the largest of the L-shaped notches leading to the electrode contact face.

In accordance with another feature of the invention, the coating has an axis of symmetry passing through the electrode contact face, and the notches are in the form of two groups of L-shaped notches disposed in mirror symmetry relative to the axis of symmetry.

In accordance with a concomitant feature of the invention, the coating is substantially quadrilateral and the notches are disposed at an angle relative thereto.

Other features which are considered as characteristic for the invention are set forth in the appended claims.

Although the invention is illustrated and described herein as embodied in microstrip capacitor for energy storage, preferably for high-energy lasers, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which:

FIG. 1 is a schematic circuit diagram of a pulse-forming network in a Blümlein circuit in which a microstrip capacitor according to an embodiment of the invention can be used;

FIG. 2 is a diagrammatic axial-sectional view taken through an embodiment of a microstrip capacitor assembly for the circuit according to FIG. 1, there being shown only two capacitance units and a fast high-voltage contact break space and a laser chamber respectively disposed on two external longitudinal sides;

FIG. 3 is a top plan view of a first embodiment of a capacitor coating;

Figure 4:
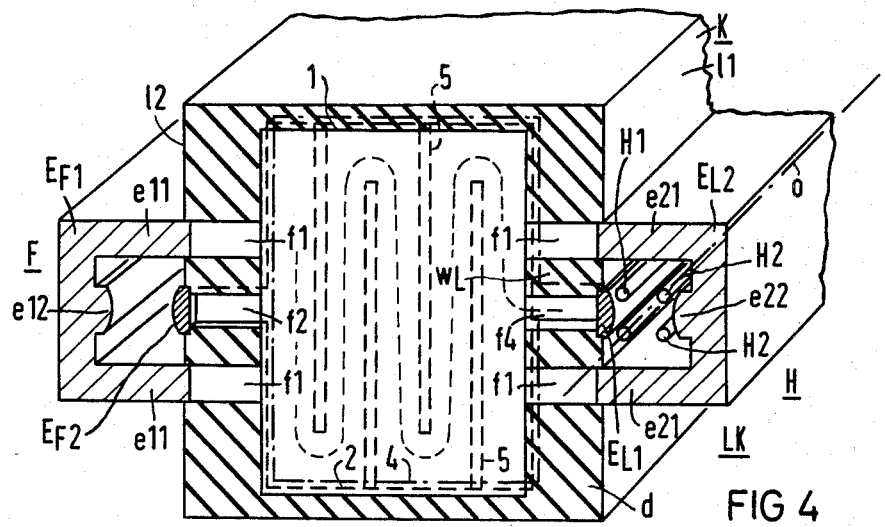
FIG. 4 is a fragmentary perspective view of the assembly shown in FIG. 2, provided with capacitor coatings according to FIG. 3.

FIGS. 1, 2, 8 and 9 have already been described as FIGS. 1, 2, 4 and 5 in German Published, Non-Prosecuted Application DE-OS No. 29 32 781, corresponding to U.S. application Ser. No. 177,442, filed Aug. 12, 1980, and have been used again in the present application for a better understanding of the invention.

Referring now to the figures of the drawing and first, particularly to FIG. 1 thereof, there is seen a Blümlein circuit which symbolizes a laser chamber LK with two electrodes $E_{L1}$ and $E_{L2}$ and a fast high-voltage contact-break space or distance F between two electrodes $E_{F1}$ and $E_{F2}$. The contact-break space F must meet the requirements of the pulse-forming network with respect to bias, switching speed, peak current and average switching capacity. This requirement is met, for example, by spark gaps, thyratons, so-called plasma switches, as they were introduced at the "International Pulsed Power Conference" in June 1981 in lecture 16.3 or parallel circuits of several such switching elements. The contact-break space F serves, along with wiring to be described hereinbelow, for firing a gas discharge and for applying a high-voltage pulse between the electrodes $E_{L1}$ and $E_{L2}$ of the laser chamber LK, respectively. A first microstrip capacitor $C_F$ is connected in parallel with the contact-break space F. Coatings 1, 2 of the capacitor $C_F$ are connected with the contact-break space F by connections a1, a2. A second microstrip capacitor $C_K$ is connected in series with the laser chamber LK. The coatings 2 and 3 of the capacitors $C_F$ and $C_K$ are connected to each other to the potential of a high-voltage source HV, isolated from ground. On the side of ground or earth potential, the electrode $E_{F1}$ of the contact-break space F and the electrode $E_{L2}$ of the laser chamber LK as well as the coating 1 of the first capacitor $C_F$ are connected with each other and with ground or earth potential. The electrode $E_{L1}$ of the laser chamber LK and the coating 4 of the second capacitor $C_K$ are respectively connected to ground or earth potential through a high impedance $R_K$ which is highly resistive in comparison with the resistance value of the fired plasma.

According to FIGS. 2 and 4, the pulse-forming network is transposed into a spatial or three dimensional apparatus in which the coating 1 to 4 of the first and second microstrip capacitors $C_F$ and $C_K$ and intermediate, dielectric layers d thereof extend substantially in a normal direction relative to the optical axis o of the laser chamber LK. Furthermore, the coatings 1 to 4 are stacked substantially parallel to the optical axis o of the laser and of the laser chamber LK to form a stack of capacitors. This is also done through the use of connecting lugs which have free lateral ends and are generally labelled with reference symbol f, as seen in FIG. 4 and are connected to the electrodes $E_{L1}$ and $E_{L2}$ of the laser chamber LK. In FIG. 2, reference symbol $C_F$, K denotes the smallest common capacitance unit of which an amount n are stacked in parallel with the laser axis and are contacted in series with the laser chamber LK, wherein $n = 1, 2 \ldots, n-1, n$. In FIG. 2, the laser chamber LK and the contact-break space F are only represented diagrammatically, in comparison with the representation according to FIG. 4, which is done by way of tubular bodies. FIG. 4 shows a simple, structural embodiment. A comparison of FIGS. 1 and 3 shows that a Blümlein circuit also forms the basis of the excitation system according to FIG. 2. Therefore, the coatings of the first and second microstrip capacitors $C_F$ and $C_K$ are labelled with the same reference numerals 1, 2, 3, 4 as in FIG. 1. The dielectric layers d are disposed between the layers 1, 2 and 3, 4, respectively, which lie at a different high-voltage potential during operation. Since the coatings 4, 4 and 2, 3 lie at the same potential (they are both connected to the same electrode $E_{L1}$ of the laser chamber LK) they could also be combined structurally in the intermediate space z between the two capacitance units $C_F$, K to form a single coating. An integrated construction of the coatings 4, 4 and 2, 3 is appropriate more particularly when a liquid dielectric, such as chemically pure water, is used.

Vital significance is attached to the low-induction contacting of the microstrip capacitor plates with the electrodes $E_{L1}$ and $E_{L2}$ of the laser chamber LK and to the pulse formation. The perspective representation according to FIG. 4, which simultaneously provides a cross-sectional view, shows that through the use of two legs b1, the coating 1 of the capacitor $C_F$ contacts the electrode $E_{F1}$, which encompasses the contact-break space F. This electrode $E_{F1}$ has an approximately E-shaped cross section with two outer legs e11, e11 and a central leg e12. Halogen-resistant metals, such as high grade steel or aluminum, are used for the electrodes of the laser chamber. All of the wall areas of the laser chamber LK which are not formed by electrode material are connected with each other and with the electrodes by synthetic material, for example PVDF (polyvinylidene fluoride), which is temperature-resistant, ultraviolet radiation resistant and chemically resistant with respect to the laser gas. They may also be connected by extremely pure $Al_2O_3$ ceramic material so that the gas mixture inside the laser chamber LK can be kept at the desired pressure (usually between 50 mbar and several bar). The aforementioned insulating wall portions of the laser chamber LK are labelled with reference symbol WL in FIG. 4. The contact-break space F, which does not need to be described in any greater detail and which, moreover, is described in greater detail in Published Non-Prosecuted Application DE-OS No. 29 32 781, has corresponding wall portions. The individual plates or sheets for the dielectric d in each case project in the peripheral area beyond the coatings 1, 2, 3, 4, as shown by the contour of the capacitor stack K, so that leakage or spark-over paths in the peripheral area are avoided. While the coating 1 of the capacitor $C_F$ in FIG. 4 is represented by a continuously drawn edge, the coating 2 is indicated by a broken line 2 which lies partly inside the line 1. The coating 2 is connected by a lug f2 to one pole of the contact-break space F. The capacitor coating 4 is indicated in FIG. 4 by dot-dash lines. The coating 4 is connected by means of a connecting lug f4 to the electrode $E_{L1}$ of the laser chamber LK. The other electrode $E_{L2}$ of the laser LK has an approximately E-shaped cross section with two outer electrode legs e21, e21 and a central leg e22 which forms the actual electrode $E_{L2}$ and which faces the counter electrode $E_{L1}$ with a space therebetween. At the two electrode legs e21, e21, the coating 1 of the capacitor $C_F$ is connected to the two lugs f1. Disposed within the laser chamber LK, at a slight distance from and parallel to the axis of the laser electrodes $E_{L1}$, $E_{L2}$, are pre-ionizing rods which are generally labeled with reference symbol H, in the form of two pre-ionizing rods H2 belonging to the electrode $E_{L2}$ and two pre-ionizing rods H1 belonging to the electrode $E_{L1}$. Pre-ionizing rods and electrodes of this type are described in detail in U.S. application Ser. No. 303,167, filed Sept. 17, 1981, together with a suitable circuit, and therefore do not need to be described in any greater detail in the present application. In FIG. 2 reference numeral 23 indicates a wide lug for a conductive connection between the two capacitor coatings 2, 3. However, the coatings 2, 3 could also be constructed together in one piece and could be given their illustrated shape by bending.

The embodiment of the invention relates more particularly to the formation of the capacitor coatings 4 of FIG. 2 of the microstrip capacitor $C_K$ connected to the first electrode $E_{L1}$ of the laser chamber LK. These coatings 4 are provided, as is illustrated in the detailed representation according to FIG. 3 and the fragmentary representation in FIG. 4, with notches 5 which increase their current path length for the discharge current $I_L$. The discharge current $I_L$ is indicated in FIG. 3 as a vector field. The notches 5 extend alternately from two opposite sides 4.1, 4.2 (and, in the coating side direction 1 are mutually offset by the distance a1) into the coating so that meandering current paths 6 are formed along the coating face as far as an electrode connection (connecting lug f4.3) lying on a third side 4.3 of the coating 4. The distance a1 between adjacent notches could increase in a direction towards the lug f4.3. This connecting lug f4.3 is connected in each case in a conductive manner with the connecting lugs f4 of the laser electrode $E_{L1}$ or is constructed in one piece therewith.

Many types of forms for the coatings of the microstrip capacitors $C_F$ and $C_K$ are conceivable, such as circular, elliptical, generally polygonal, etc., it also being possible to extend the current path length in such forms of the coatings by making notches. In this case, the characteristics of the delay lines thus formed can be determined by the length of the notches, their distance from each other as well as from the coating peripheries, and by the angle which they form with each other and with the coating peripheries. The pulse formation on the basis of the current path 6 producing the delay lines can also be influenced, apart from by the position and the form of the notches 5, by the face of the coating 4, that is, its length l1 and its height h1. It is particularly advantageous for the excitation system represented in FIG. 4 if the surface area of the coating 4 is essentially quadrilateral, and if furthermore the notches 5 extend from the two opposite longitudinal sides 4.1, 4.2 into the coating, and the electrode connecting lug f4.3 is disposed on a narrow side, in this case the side 4.3.

Figure 5:
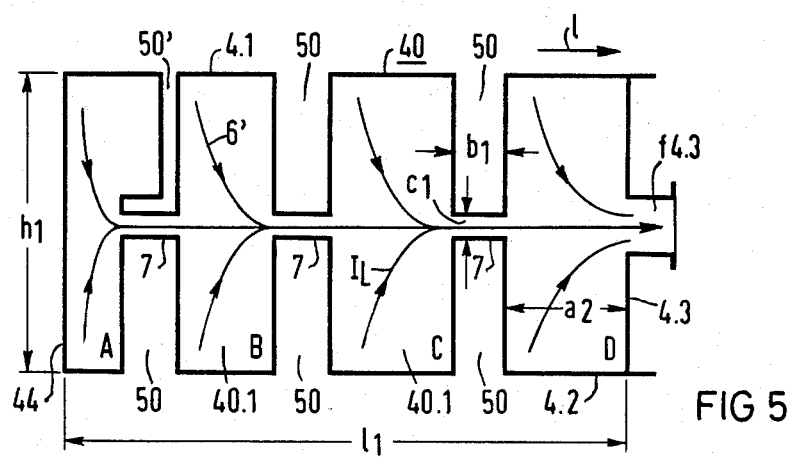
FIG. 5 is a view similar to FIG. 3, showing a second embodiment of a capacitor coating.

In the second embodiment according to FIG. 5, the capacitor coating represented is labeled with reference symbol 40 and the notches are labeled with reference symbol 50. As can be seen in the figure, the notches 50 extend in pairs opposite each other from two opposite sides into the coating, the pairs 50, 50 being mutually offset in the coating side direction l by the distance a2 (this distance between adjacent notches could increase in the direction towards the lug f4.3) so that current path webs 7 remain in each case between opposite notches 50, 50. In this case as well as in the first embodiment according to FIGS. 3 and 4, the notches 5, now the notches 50, run parallel to each other. The height of the coating is again labeled with reference symbol h1, its length in a lateral direction is labeled with reference symbol l1, and the distance between the notches 50 and from the notches to the side faces 4.3, 4.4, respectively, is given reference symbol a2. In addition reference symbol b1 is the notch width, and c1 is the width of the current path webs 7. This construction produces the path which is diagrammatically indicated by the curved lines 6'. This path of the discharge current and of the associated current paths, can be characterised approximately as directed in the form of the arrows toward the electrode connecting lug f4.3. A collecting current is produced along the central current path webs 7, to which the component currents of the individual component coatings 40.1 contribute. As can also be seen, in this embodiment the distance a2 between the notches 50 and the width of the component coatings 40.1 which is equivalent to this, increases in the direction of l towards the electrode connecting lug f4.3. For illustrative purposes, the component coatings 40.1 are labeled A, B, C and D in sequence beginning at the left end of the coating 40 in FIG. 5 as far as the connecting lug f4.3, D being the widest and A being the narrowest coating. In this example, the electrical characteristicts of the capacitor delay line can be influenced in a controlled manner and can be adapted to the requirements of the laser by the variables a2, b1, c1, l1, and h1. So as not to reduce the capacitance of the coatings A, B, C and D, the notches 50 can be "narrowed" to form L-shaped notches 50', as indicated in the upper left half of FIG. 5.

Figure 6:
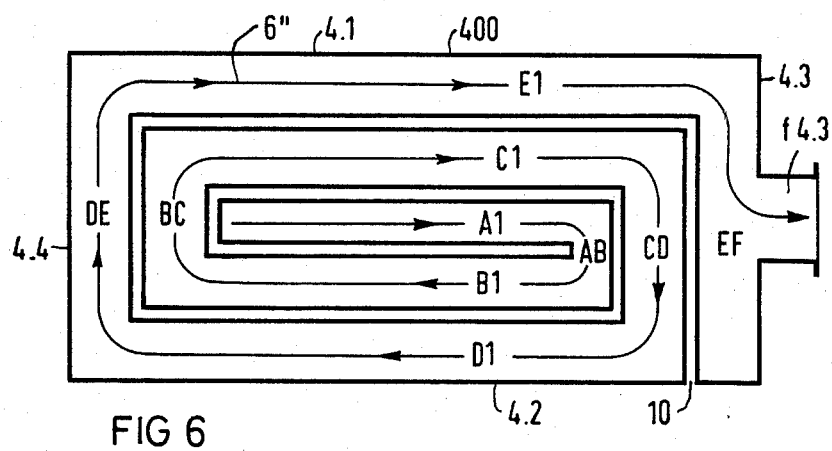
FIG. 6 is another view similar to FIG. 3 showing a third embodiment of a capacitor coating.

In the third embodiment according to FIG. 6, the capacitor coating which is again essentially quadrilateral is given reference symbol 400, and is provided with a notch 10 which extends in a spiral from the outside edge to within the coating so that current paths 6" are produced which extend in a spiral from within the coating as far as the outer electrode connecting lug f4.3, and which extend along the remaining coating component faces with spiral legs A1 to E1 and associated by connecting webs AB, BC, DC, DE and EF from the inside to the outside as far as the connecting lug f4.3. In this case, it would even be possible to provide multiple notches with relatively narrow component notches running parallel to each other. As already indicated above, other shapes would also basically be possible (circular, elliptical, polygonal, etc.) which are suitable for making spiral notches.

Figure 7:
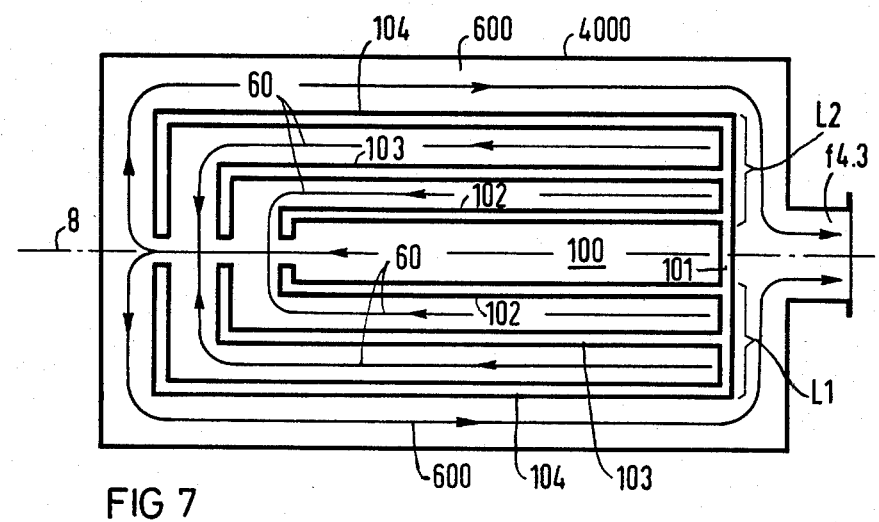
FIG. 7 is a further view similar to FIG. 3 showing a fourth embodiment of a capacitor coating.

In the fourth embodiment according to FIG. 7, the coating outline is again essentially quadrilateral and the notches are generally indicated by reference symbol 100. Extended into the coating from a common leg connecting notch 101 which is formed near the coating periphery 4.3, are approximately L-shaped notches 102 to 104 which are nested into each other. Between the L-shaped notches 102-104 are component current paths 60 which are disposed parallel to each other and which open into a collecting current path 600 outside the largest notch 104, which leads jointly to the electrode connecting lug f4.3. FIG. 7 shows more particularly that two notch groups L1 and L2 are disposed in mirror symmetry relative to an axis of symmetry 8 of the coating 4000, which passes through the electrode connecting lug f4.3. Therefore, this also produces symmetrical current paths 60 and 600.

Due to the essentially quadrilateral plan view, in the embodiments according to FIGS. 6 and 7, the spiral and L-shaped notches also respectively extend in an angular manner relative to each other. This has advantages with respect to manufacturing techniques (milling or cutting straight faces).

The mode of operation of the circuit according to FIG. 1 is briefly described hereinbelow. The capacitors $C_F$ and $C_K$ are charged to the high voltage HV. The laser chamber LK lies above the highly resistive impedance $R_K$ at ground potential. After closing the switch provided by the space F (firing the contact-break space), a high voltage builds up between the electrodes of the laser chamber, and there is a voltage breakdown, the laser gas being stimulated for emission. On the basis of the embodiments of the invention, the excitation pulse which lies at the electrodes of the laser chamber Lk during emission can now be formed in an essentially quadrilateral manner with a prolonged pulse duration, which is desired in many applications.

Figure 8:
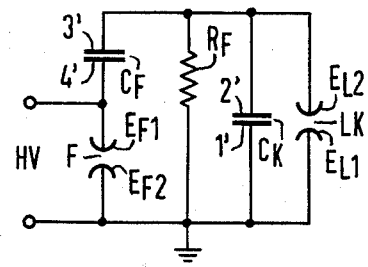
FIG. 8 is a view similar to FIG. 1 showing a charge transfer circuit for a pulse-forming network.
Figure 9:
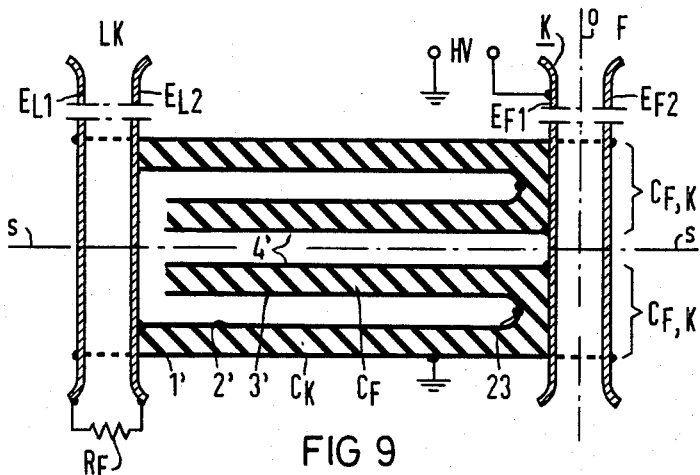
FIG. 9 is a view similar to FIG. 2, showing an axial section through the associated exciting system, including microstrip capacitors, a laser chamber and a fast high-voltage contact-break space.

FIG. 8 shows the circuit diagram of a so-called charge transfer circuit which, in the same way as the Blümlein circuit according to FIG. 1, can serve as a pulse-forming network in order to create the high-voltage pulses for the laser chamber LK. The same parts bear the same reference numerals in this embodiment, with the exception of the capacitor coatings which are given the same reference numerals, with the addition of a prime.

FIG. 9 again shows a transposition into a spatial laser apparatus for an excitation system, the capacitor coatings formed being given reference symbols 2', 3', therein. In order to form pulses, in this case the capacitor coatings 2', 3' which are connected with the electrode $E_{L2}$ must be constructed according to an embodiment of the invention.

The advantages which can be obtained with the above-described embodiments can be seen above all in that the meandering, spiral or looped detours which the discharge current must make because of the notches, form delay lines which act to prolong the service life. The charging capacity of the capacitor coatings is only insignificantly reduced by the notches, while the structural volume does not need to be increased.

There are claimed:

1. In a high-energy laser of the TE type having an optical axis, a laser chamber with at least two laser electrodes having a gas space therebetween, the laser electrodes being spaced apart opposite each other and extending parallel to the optical axis, excitation produced by an arc-free capacitor discharge in the gas space being as homogeneous as possible, a pulse forming network connected to the laser electrodes, conductors of a stripline capacitor connected to the laser electrodes, contact-break electrodes connected to a fast high-voltage switch, the contact-break electrodes being connected to the laser electrodes, dielectric layers disposed between the conductors of the stripline capacitor in a direction substantially normal to a direction in which they are stacked parallel to the optical axis of the laser, the laser electrodes comprising a first electrode connected through the stripline capacitor to the pulse-forming network for a high voltage pulse, and a second electrode disposed opposite the first electrode and being connected to ground potential, wherein the improvement comprises: at least one of the conductors of the stripline capacitor connected to the first laser electrode having notches formed therein for increasing current path length therethrough for discharge current.

2. A high-energy laser according to claim 1, wherein said one notched conductor has a face, two opposite sides and a third side, having an electrode contact face integral with said third side, said two opposite sides having said notches, alternately formed therein in a given conductor side direction and extending into the one notched conductor, said notches being mutually spaced apart forming meander-shaped current paths along said conductor face up to said electrode contact face.

3. A high-energy laser according to claim 2, wherein said mutual spacing between said notches increases toward said electrode contact face.

4. A high-energy laser according to claim 1, wherein said one notched conductor has two opposite sides having said notches formed therein opposite each other in pairs and extending from said sides into the conductor in a given conductor side direction, said notches being mutually spaced apart and leaving current path webs remaining between opposite notches.

5. A high-energy laser according to claim 4, wherein said one notched conductor has a third side having an electrode contact face integral therewith, said mutual spacing between said notches being increased toward said electrode contact face.

6. A high-energy laser according to claim 1, wherein said notches are mutually parallel.

7. A high-energy laser according to claim 1, wherein said one notched conductor is substantially quadrilateral.

8. A high-energy laser according to claim 1, wherein said one notched conductor has two opposite longitudinal sides and a narrow side having an electrode contact face integral with said narrow side, said two opposite sides having said notches formed therein and extended from said sides into the conductor.

9. A high-energy laser according to claim 1, wherein said one notched conductor has an outer edge and an outer electrode contact face, and said one notched conductor has said notches formed therein in the form of a spiral extending from said outer edge to inside the one notched conductor, producing current paths extending in a spiral from inside the one notched conductor to said outer electrode contact face.

10. A high-energy laser according to claim 9, wherein said one notched conductor is substantially quadrilateral and said notches are disposed at an angle relative thereto.

11. A high-energy laser according to claim 1, wherein said one notched conductor has an outer periphery and an electrode contact face integral therewith, and said notches are in the form of substantially L-shaped notches varying in size and being nested inside each other and extending into the one notched conductor from a common leg connecting notched disposed in vicinity of the outer periphery, forming mutually parallel component current paths which open into a common collecting current path outside the largest of said L-shaped leading to said electrode contact face.

12. A high-energy laser according to claim 11, wherein said one notched conductor has an axis of symmetry passing through said electrode contact face, and said notches are in the form of two groups of L-shaped notches disposed in mirror symmetry relative to said axis of symmetry.

13. A high-energy laser according to claim 12, wherein said one notched conductor is substantially quadrilateral and said notches are disposed at an angle relative thereto.

14. A high-energy laser according to claim 11, wherein said one notched conductor is substantially quadrilateral and said notches are disposed at an angle relative thereto.

* * * * *